UNITED STATES PATENT OFFICE.

FRITZ HOFMANN AND CARL COUTELLE, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING BETA-METHYLADIPIC ACID.

991,720.  Specification of Letters Patent.  Patented May 9, 1911.

No Drawing.  Application filed November 23, 1909.  Serial No. 529,545.

*To all whom it may concern:*

Be it known that we, FRITZ HOFMANN and CARL COUTELLE, doctors of philosophy, chemists, citizens of the German Empire, residing at Elberfeld, Germany, have invented new and useful Improvements in New Processes for Producing Beta-Methyladipic Acid, of which the following is a specification.

Our invention relates to a new and valuable process for producing beta-methyladipic acid which is a valuable intermediate compound for producing other products of technical importance.

The new process consists in treating para-methylcyclohexanon:

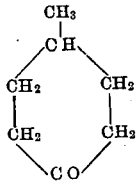

with oxidizing agents, such as $HNO_3$, $KMnO_4$, $K_2Cr_2O_7$, etc.

In order to illustrate the new process more fully we can proceed as follows, the parts being by weight:—4 parts of para-methylcyclohexanon are slowly introduced into 20 parts of boiling concentrated nitric acid. Part of the beta-methyladipic acid separates in a pure state while cooling. The other part can be isolated from the mother liquor by concentrating the mother liquor by evaporation and subsequent cooling. Other oxidizing agents can be used. The formation of the product takes probably place according to the following formula:

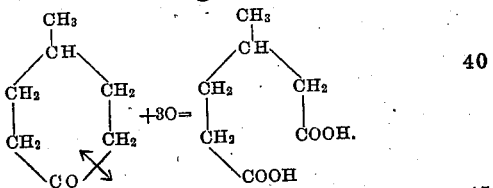

Methyladipic acid is mainly used in synthetic chemistry for the production of pharmaceutical products, colors, terpenes and other technical substances.

We claim:—

1. The process for producing beta-methyladipic acid, which process consists in treating para-methyl-cyclohexanon with oxidizing agents, substantially as described.

2. The process for producing beta-methyladipic acid, which process consists in treating para-methylcyclohexanon with nitric acid, substantially as described.

In testimony whereof we have hereunto set our hands in the presence of two subscribing witnesses.

FRITZ HOFMANN. [L. S.]
  CARL COUTELLE. [L. S.]

Witnesses:
 OTTO KÖNIG,
 CHAS J. WRIGHT.